United States Patent [19]

Davis et al.

[11] 4,354,002
[45] Oct. 12, 1982

[54] NOVEL ALIPHATIC SULFOSILOXANE-SILICATE COPOLYMERS

[75] Inventors: Pauls Davis, Gibraltar; Joe C. Wilson, Woodhaven, both of Mich.

[73] Assignee: BASF Wyandotte Corporation, Wyandotte, Mich.

[21] Appl. No.: 249,916

[22] Filed: Apr. 1, 1981

[51] Int. Cl.$^3$ ............................................. C08L 83/06
[52] U.S. Cl. ................................. 524/588; 106/14.13; 252/389 R
[58] Field of Search ............... 106/14.13; 260/29.2 M; 528/30; 525/477; 556/428; 252/75, 389 R; 524/588, 609

[56] References Cited

U.S. PATENT DOCUMENTS

| | | | |
|---|---|---|---|
| 2,968,643 | 1/1961 | Bailey | 528/30 |
| 3,198,820 | 8/1965 | Pines et al. | 252/75 |
| 3,312,622 | 4/1967 | Pines et al. | 252/75 |
| 3,337,496 | 8/1967 | Pines et al. | 260/46.5 |
| 3,341,469 | 9/1967 | Pines et al. | 252/389 |
| 3,507,897 | 4/1970 | Kammer et al. | 556/428 |

*Primary Examiner*—Theodore E. Pertilla
*Attorney, Agent, or Firm*—Andrew E. Pierce

[57] ABSTRACT

Sulfosiloxane-silicate copolymers are useful corrosion inhibitors in alcohol-based antifreeze compositions. The aliphatic sulfosiloxane-silicate copolymers contain repeating units derived from aliphatic sulfosiloxanes and water-soluble silicates.

4 Claims, No Drawings

NOVEL ALIPHATIC SULFOSILOXANE-SILICATE COPOLYMERS

BACKGROUND OF THE INVENTION

1. Field of the Invention

This invention relates to a corrosion inhibited aqueous alcohol solution, particularly to an antifreeze composition, useful as a coolant in a heat-exchange system such as the cooling system of an internal combustion engine.

2. Prior Art

Organosiloxane-silicate copolymers were disclosed by Pines et al. in U.S. Pat. No. 3,337,496 and their use in preventing the corrosion of metals was disclosed in U.S. Pat. No. 3,341,469. Other silicone-silicate copolymers and their uses have been disclosed in U.S. Pat. Nos. 3,312,622; 3,198,820; 3,203,969; and 3,248,329.

Sulfonate siloxanes have been disclosed in U.S. Pat. Nos. 2,968,643; 3,215,643; and 3,507,897.

The novel silicone sulfonate-silicates of the invention have not been disclosed in the prior art nor has their use been disclosed in preventing corrosion of metals in contact with aqueous liquids.

SUMMARY OF THE INVENTION

The aliphatic silicone sulfonate-silicate copolymers of the invention contain 0.1 to 99.9 parts by weight (per 100 parts by weight of said copolymer) of at least one silicone sulfonate group member derived from a silicone sulfonate having the formula:

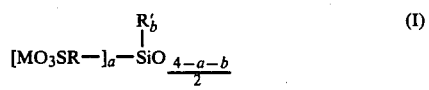

wherein M is a monovalent, divalent or trivalent cation, preferably monovalent and selected from at least one of the group consisting of ammonium, tetraorganoammonium, hydrogen and alkali metal ions such as lithium, sodium, potassium and cesium. R is a divalent aliphatic hydrocarbon radical preferably selected from the group consisting of alkylene radicals containing from 2 to 30 carbon atoms and cycloalkylene radicals containing from 4 to 18 carbon atoms. R' is an alkyl radical of from 1 to 8 carbon atoms and a has an average value of from 1 to 3, b has an average value of from 0 to 2 and the total of a+b is 1 to 3. The copolymers of this invention also contain from 0.1 to 99.9 parts by weight of at least one silicate group member derived from a water-soluble silicate having the formula:

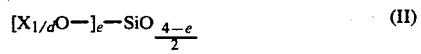

wherein X is a cation that forms a water-soluble silicate preferably selected from at least one of the group consisting of sodium, potassium, lithium, rubidium, and tetraorganoammonium cations; d is the valence of the cation represented by X and has a value of at least 1; and e has a value from 1 to 3, said parts by weight of said group members in said copolymer being based upon 100 parts by weight of said copolymer.

The copolymers of the invention are useful in inhibiting the corrosion of metals below sodium in the electromotive series that come in contact with an aqueous liquid. Representative of such metals are iron, brass, copper, aluminum, steel, and solder comprising lead and tin. A corrosion inhibiting amount of said copolymer is added to said liquid to effect inhibition of corrosion of metals. The copolymers of the invention are superior to soluble silicates used alone in that said copolymers provide long lasting corrosion protection as compared to the use of soluble silicates as corrosion inhibitors for metals in contact with aqueous liquids.

DETAILED DESCRIPTION OF THE INVENTION AND THE PREFERRED EMBODIMENTS

The copolymers of the invention contain about 0.1 to about 99.9 parts by weight (per 100 parts by weight of the copolymer) of at least one repeating silicone sulfonate member derived from a silicone sulfonate selected from the group consisting of silicone sulfonates represented by formula I above in combination with 0.1 to 99.9 parts by weight of at least one recurring silicate unit derived from water-soluble silicates represented by formula II above. Preferably, the copolymers of this invention contain about 5 to about 45 parts, and most preferably about 15 to about 25 parts by weight (per 100 parts by weight of said copolymer) of silicone sulfonate groups derived as indicated above in combination with about 55 to about 95 parts and most preferably about 75 to 85 parts by weight (per 100 parts by weight of said copolymer) of silicate groups derived from said water-soluble silicates.

A corrosion inhibiting amount of the copolymers of the invention is used in a process for inhibiting the corrosion of metals below sodium in the electromotive series that come in contact with an aqueous liquid. Generally, about 0.125 to about 4 parts by weight, preferably about 0.25 to about 1.25 parts by weight, and most preferably about 0.75 to about 1.0 part by weight of said copolymer is used all based upon 100 parts by weight of inhibited aqueous liquid composition. The process comprises adding to said liquid a corrosion inhibiting amount of the copolymer of the invention. Generally, the copolymer of the invention is formed simply by combining at ambient temperature and pressure the silicone sulfonate and the water-soluble silicate described above. Preferably, said silicone sulfonate and water-soluble silicate are combined in an aqueous medium, preferably containing a water-soluble alcohol such as ethylene glycol.

Representative silicone sulfonates useful in the preparation of the silicone sulfonate-silicate copolymers of the invention are those in which R in the formula described above represents: $CH_2CH_2CH_2$, $CH_2CH(CH_3)CH_2$, $CH_2CH(CH_2CH_3)CH_2$, $CH_2(CH_2)_4CH_2$, $CH_2(CH_2)_3CH_2$, and $CH_2(CH_2)_{28}CH_2$. Illustrative cycloalkylene radicals that R in the above formula I can represent are:

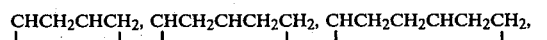

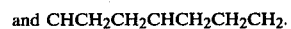

The sulfur atom is attached to a carbon atom in the alkylene or cycloalkylene radical which is at least the second carbon atom away from the silicon atom. Preferably R is an alkylene radical of from 3 to 18 carbon atoms. R' is an alkyl radical of from 1 to 8 carbon atoms. Illustrative of such alkyl radicals are methyl, ethyl, propyl and butyl. There is an average of from 1 to 3 sulfur-containing radicals per silicon atom and from 0 to 2 alkyl radicals per silicon atom in said silicone sulfonates and a total average of from 1 to 3 total MO$_3$SR— and R' radicals per silicon atom.

Generally, these silicone sulfonates are prepared by oxidizing either a siloxane thiuronium salt or thiocyanoalkyl- or thiocyanocycloalkyl-siloxane. Salts of these sulfoalkyl- and sulfocycloalkyl-siloxanes are prepared by the reaction of a sulfoalkyl- or sulfocycloalkyl-siloxane with a base such as sodium hydroxide, potassium hydroxide, ammonium hydroxide or the like or by treating with ammonia.

The silicone sulfonates described above are copolymerized with conventional water-soluble silicates of formula II. Illustrative of the useful water-soluble silicates are the following: KOSiO$_{1.5}$, NaOSiO$_{1.5}$, (KO)$_2$SiO, (NaO)$_2$SiO, (KO)$_3$SiO$_{0.5}$, and (NaO)$_3$SiO$_{0.5}$.

The copolymers of the invention are useful in the preparation of aqueous antifreeze concentrate compositions in which the aqueous liquid comprises a major proportion of at least one water-soluble alcohol, preferably selected from the group consisting of methanol, ethanol, propanol, ethylene glycol, diethylene glycol, triethylene glycol, propylene glycol, methoxypropanol and glycerol in combination with the copolymer described in greater detail herein before. Ethylene glycol is typically the alcohol utilized and especially the commercially-available mixtures thereof containing a major proportion of ethylene glycol and a minor amount of diethylene glycol. The commercial mixture of ethylene glycol generally contains at least 85 to 97 percent by weight ethylene glycol with the remainder being diethylene glycol.

Preferably, about 85 percent by weight to about 97 percent by weight of the antifreeze concentrate is ethylene glycol and up to about 10 percent by weight of the total weight of said concentrate is diethylene glycol. Most preferably, said antifreeze contains about 90 percent to about 95 percent by weight ethylene glycol and 2 percent to 7 percent by weight diethylene glycol, all based upon the total weight of said antifreeze concentrate. The remainder of the composition comprises a conventional corrosion inhibitor, water, an antifoam agent, and optionally, a water-pump lubricant.

The copolymers of this invention are generally useful in the protection of all metals and alloys that are used in industrial processes and apparatus. Metals whose corrosion is retarded by the copolymers of this invention include the metals below sodium in the electromotive series (e.g., magnesium, aluminum, copper, iron, manganese, nickel, lead, silver, tin, beryllium and zinc) as well as the alloys of such metals (e.g., brass, bronze, solder alloys, steel and the like). Such metals are solids at 25° C. and normally become corroded when in prolonged contact with water, particularly when the water is at elevated temperatures and/or contains electrolytes (e.g., acidic solutes). The copolymers of this invention are particularly useful in the protection of brass, iron, copper and aluminum.

The amount of the copolymers of this invention used in inhibiting corrosion of metals in contact with aqueous liquids is dependent upon the temperature, type of metal or metals being protected, type of any organic liquid in the solution, pH of the aqueous liquid, velocity of the aqueous liquid, inorganic solutes (e.g., electrolytes such as chlorides, sulfates and bicarbonates) in the aqueous liquid and prior treatment or corrosion of the metal.

Compared with known inhibitors used in preventing corrosion of metals that are in contact with water, the copolymers of this invention provide numerous advantages. Thus, the copolymers can be added to a wide variety of aqueous solutions and inhibit the corrosion of a wide variety of metals. In addition, the copolymers are effective over a wide temperature range and these inhibitors do not cause the liquids in which they are employed to foam excessively. Furthermore, these copolymers do not promote the decomposition of any organic liquids present in the liquid nor do they attack other organic materials with which the liquid may come in contact.

The copolymers of the invention are useful in preventing the corrosion of metals that are cleaned by corrosive solutions or that are used in cooling coils, boilers, refrigeration and air conditioning equipment, heat exchange tubes, storage tanks for liquids, pipes, solvent containers, tank cars, ballast tanks containing sea water and the like. The copolymers of this invention are particularly useful for inhibiting the corrosion of the metals in the cooling system of an internal combustion engine in contact with an aqueous alcohol coolant composition.

Conventional corrosion inhibitors and/or alkaline pH buffers which can be used under aqueous alkaline conditions in combination with the copolymer corrosion inhibitors of the invention include water-soluble metal salts such as the alkali metal carbonates, borax, the alkali metal dichromates, the alkali metal phosphates, the alkali metal tungstates, the alkali metal salts of benzoic or toluic acid, the alkali metal salts of phenol, benzotriazole or tolyltriazole, lower alkanolamines (C$_2$–C$_6$), for instance, triethanolamine, alkali metal nitrates, alkali metal nitrites, alkali metal molybdates, and alkali metal mercaptobenzothiazoles.

Generally, such conventional corrosion inhibitors are used under alkaline conditions in an amount effective to inhibit corrosion. Generally, conventional corrosion inhibitors are used in the amount of about 0.03 parts to about 5 parts by weight, preferably about 0.1 to about 2.0 parts by weight per 100 parts total weight of the antifreeze concentrate.

Antifreeze concentrate compositions can be prepared simply by mixing or dissolving the corrosion inhibitors in the alcohol compounds utilized in the concentration set out above. The method of formulating an antifreeze concentrate composition does not differ from that of the prior art with the exception of providing the novel copolymer corrosion inhibitors of the invention disclosed herein. In addition to the above copolymer and conventional corrosion inhibitors, the antifreeze concentrate compositions can contain additives of the prior art such as antifoam agents, water-pump lubricants, acid-base indicators, dyes and the like. Such additives can be employed in the amounts described in the prior art and are generally employed in amounts of less than 5 percent by weight, preferably about 0.1 to about 2.0 parts by weight, all based upon the weight of the antifreeze concentrate.

The pH of the aqueous liquid compositions of the invention is alkaline and generally adjusted to a pH of about 8 to about 12, preferably about 8 to about 11, and most preferably about 8.5 to about 10. The pH is maintained within the above pH ranges with the addition of conventional pH buffers which are generally salts of strong bases and weak acids. These buffer salts are well known in the art as indicated in U.S. Pat. No. 3,121,692.

Useful antifoam agents are the alkoxylated nonionic surfactants which exhibit low-foaming characteristics. Examples of akoxylated nonionic synthetic detergents which can be advantageously employed as antifoam agents in the antifreeze compositions of the invention include polyoxyalkylene adducts of hydrophobic bases, as illustrated by PLURONIC®L-61. Typical hydrophobic bases which can be condensed with alkylene oxides are the mono- and polyalkylphenols and the compounds prepared by condensing polyoxypropylene with a hydrophobic base initiator having from about 1 to 6 carbon atoms and at least one reactive hydrogen atom. Additional useful defoamers based upon nonionic surfactants are disclosed in U.S. Pat. No. 3,931,029, incorporated herein by reference. Useful water-pump lubricants are known in the prior art.

The antifreeze concentrates are diluted with water in accordance with prior art practice to produce an antifreeze fluid or coolant composition having a desired freezing point. Generally, the antifreeze concentrates are diluted with about 1 to about 900, preferably about 30 to about 900, parts by weight of water per 100 parts by weight of antifreeze concentrate to arrive at the coolant composition which is circulated in the cooling system, for instance, of an internal combustion engine.

Many antifreeze compositions can be formulated in accordance with the teaching of the present invention. The compositions described below are merely representative of antifreeze compositions contemplated by the invention. Where not otherwise specified throughout the specification and claims, temperatures are given in degrees centigrade and parts, percentages and proportions are by weight.

TEST METHOD

In order to demonstrate the effectiveness of the aliphatic silicone sulfonates as gel stabilizers for aqueous solutions of water-soluble silicates, the copolymers of the invention were formed by mixing, at ambient temperature and pressure, aliphatic silicon sulfonates with water-soluble silicates in a mixture of an antifreeze concentrate consisting of distilled water and antifreeze grade ethylene glycol. Samples of said concentrates were placed in sealed glass jars, aged at a temperature of 180° F. and a pH of 8 over a period of about 2 weeks, and observed for the appearance of gelation. As a means of judging the effectiveness of the siloxanes of the invention as gel stabilizers for water-soluble silicate solutions, the structurally closest siloxane was utilized as a control in a separate concentrate. Each of the sample concentrates were run in triplicate and contained 3 percent by weight distilled water, 0.4 percent by weight of sodium metasilicate ($Na_2SiO_3 \cdot 5H_2O$), the calculated amount of siloxane in weight percent, as noted below, so as to provide an equimolar amount in comparison with the control sample, and the balance antifreeze grade ethylene glycol which contains about 5 percent diethylene glycol. The silicate is in the form of $NaSiO_{1.5}$ in aqueous solution.

EXAMPLE 1

γ-(Sodium sulfopropyl)siloxane was utilized in the form $$NaO_3S-CH_2CH_2CH_2-SiO_{1.5}$$

in the amount of 0.10 weight percent (3.86 moles). After two weeks at 180° F., there was no gel evident in the solution containing the siloxane of this example.

EXAMPLE 2

(Control forming no part of this invention)

3-Hydroxypropyl siloxane was utilized in the amount of 0.043 weight percent (3.86 moles). After 3 days at 180° F., the sample containing this siloxane gelled.

While this invention has been described with reference to certain specific embodiments, it will be recognized by those skilled in this art that many variations are possible without departing from the scope or spirit of the invention, and it will be understood that it is intended to cover all changes and modifications to the invention disclosed herein for the purposes of illustration which do not constitute departures from the spirit and scope of the invention.

The embodiments of the invention in which an exclusive privilege or property is claimed are defined as follows:

1. An aqueous composition containing a copolymer consisting essentially of 0.1 to 99.9 parts by weight of at least one group member derived from silicone sulfonates selected from the group consisting of aliphatic silicone sulfonates having the formula:

$$[MO_3SR-]_a-\underset{\underline{2}}{\overset{R'_b}{\underset{|}{Si}}O_{4-a-b}}$$

wherein M is a monovalent, divalent or trivalent cation; R is a divalent aliphatic hydrocarbon radical; R' is an alkyl radical of from 1 to 8 carbon atoms; a has an average value of from 1 to 3; b has an average value of from 0 to 2 and the total average value of a+b is from 1 to 3; and from 0.1 to 99.9 parts by weight of at least one silicate group derived from a water-soluble silicate represented by the formula:

$$[X_{1/d}O-]_e-SiO_{\underline{\underline{4-e}}{2}}$$

wherein X is a cation that forms a water-soluble silicate selected from the group consisting of sodium, potassium, lithium, rubidium, and tetraorganoammonium cations; d is the valence of the cation represented by X and has a value of at least 1, and e has a value from 1 to 3 inclusive, said parts by weight of said groups in said copolymer being based upon 100 parts by weight of said copolymer.

2. The composition of claim 1 wherein said silicone sulfonate groups are present in an amount from about 5 to about 45 parts by weight and wherein said silicate groups are present in an amount from about 55 to about 95 parts by weight, said parts by weight of said groups in the copolymer being based upon 100 parts by weight of said copolymer wherein M is selected from the group consisting of at least one alkali metal, ammonium, tetraorganoammonium, and hydrogen ion and R is selected from the group consisting of at least one of alkylene and cycloalkylene radicals.

3. The composition of claim 2 wherein said silicate groups are derived from a silicate having the formula:

$NaOSiO_{1.5}$ and wherein said alkylene radical has 2 to about 30 carbon atoms and said cycloalkylene radical has 4 to about 18 carbon atoms.

4. The composition of claim 2 wherein said silicone sulfonate groups are derived from a silicone sulfonate having the formula:

$NaO_3S-CH_2CH_2CH_2-SiO_{1.5}$ and wherein said silicate groups in said copolymer are derived from an alkali metal silicate having the formula:

$NaOSiO_{1.5}.$

* * * * *